UNITED STATES PATENT OFFICE.

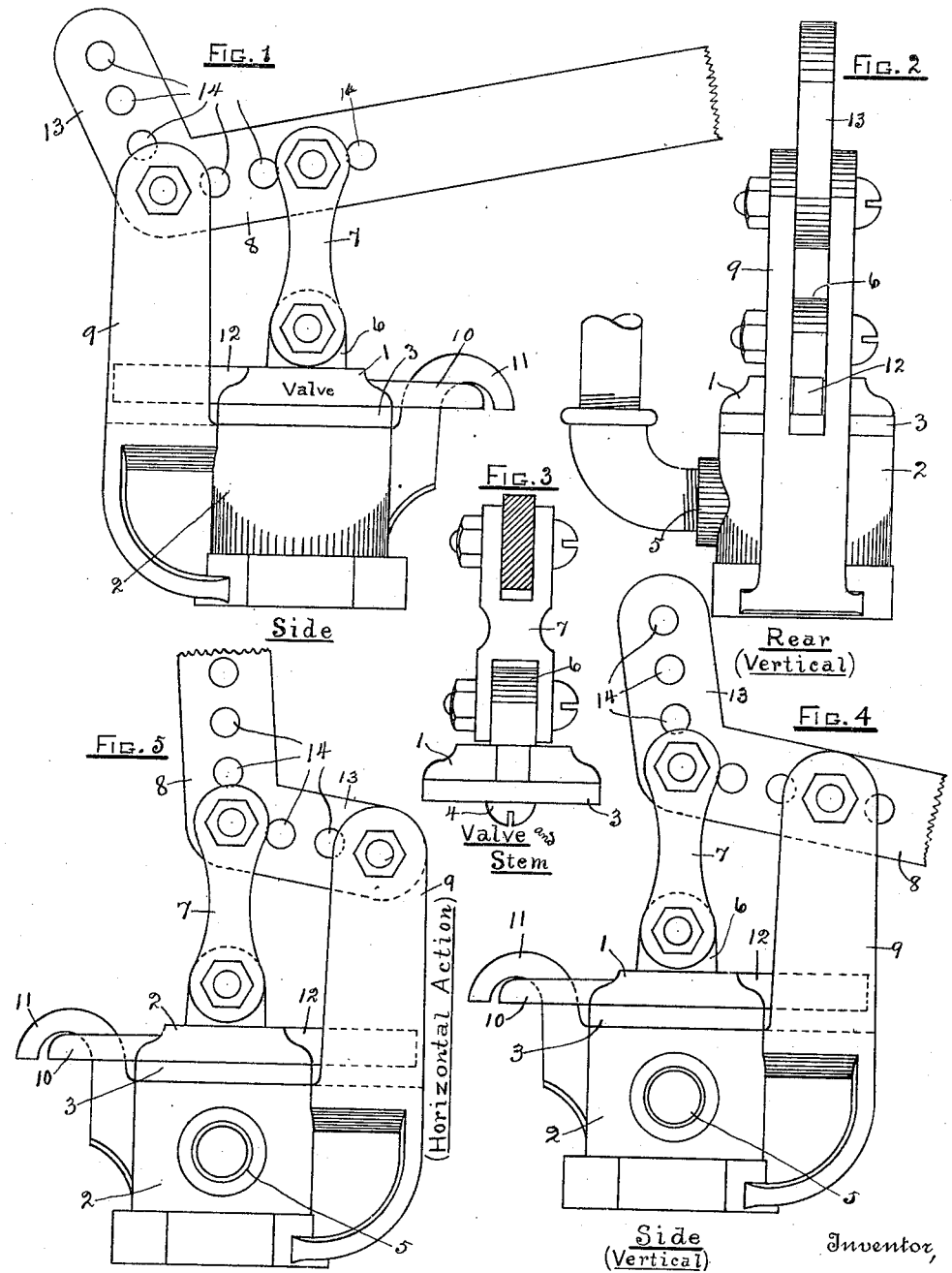

JOHN M. BIRD, OF FORT WORTH, TEXAS.

VALVE.

1,103,475. Specification of Letters Patent. Patented July 14, 1914.

Application filed March 29, 1913. Serial No. 757,599.

*To all whom it may concern:*

Be it known that I, JOHN M. BIRD, a citizen of the United States, residing at Fort Worth, in the county of Tarrant and State of Texas, have invented certain new and useful Improvements in Valves, of which the following is a specification.

This invention relates to valves and more particularly to valves which can be used both as a float valve for troughs and the like and also as a tank valve, and the object is to provide valves that can not be misplaced or broken in ordinary use and to equip the valves with devices for holding the valves in exact position when closed so that there will be no leaking through the pipes.

Another object is to provide valves which can be used on the bottom, or side, or top of a tank.

Other objects and advantages will be fully explained in the following description and the invention will be more particularly pointed out in the claims.

Reference is had to the accompanying drawings which form a part of this application and specification.

Figure 1 is a side elevation of the tank valve, showing one way of attaching the operating lever. Fig. 2 is a rear elevation of the same. Fig. 3 is a detail view of the link for connecting the valve to the operating lever. Fig. 4 is a side elevation of the valve, showing the operating lever connected in the opposite direction, adapting the valve for use in a trough with a float and also adapting the valve for use as a tank valve. Fig. 5 is a side elevation of the valve, showing the operating lever connected in a different manner, and adapting the valve for use on the end of a trough or tank.

Similar characters of reference are used to indicate the same parts throughout the several views.

The improved valve 1 is provided with a barrel 2 on which the valve seats. The valve 1 is provided with the usual leather sealing member 3 secured thereon by a screw 4. The barrel 2 is provided with a vent 5 to which a pipe may be connected. The valve 1 is provided with a projecting lug 6 which is pivotally engaged by a link 7. The link 7 is further pivotally connected to the lever 8. The barrel 2 has a projecting bifurcated standard 9 and the operating lever 8 is pivotally connected to the standard 9. The valve 1 has a shank 10 which is perforated to engage a hook 11 formed on the barrel 2. The valve engages this hook loosely so that the valve can swing vertically at the opposite side or swing on the hook as pivot. The valve has a tongue 12 on the other end which projects into the standard 9 and is guided by said standard in its vertical swinging movement. The valve 1 is thus guided on both sides and it can not be seated except directly in place on the seat or barrel 2. There is great difficulty in keeping valves from leaking which have a guide only on one side. The valve is thus guided on both sides,—on one side by the tongue 12 and on the other side by the hook 11 and shank 10. The tongue 12 is made long enough to engage the lever 8 between the members of the standard 9 so that the valve can not be thrown out of place. In stock-watering troughs there is much trouble with the valves because the cows strain the valves to one side by pushing the valves with their horns and thus cause the valves to leak. With the equipments above described it will be impossible for the stock to get the valves out of place. The barrel 2 is provided with a vent 5 and a pipe may be connected with this vent and used as a gage in troughs and used in a tank for draining the pipes. The lever 8 is provided with a short arm 13 and a plurality of holes 14 which makes the lever adjustable for use for different purposes and also for making the lever adjustable for throwing the valve sooner or later.

What I claim is,—

1. A valve having a barrel provided with a vent in the side thereof, a hook formed on the side thereof and a slotted standard formed on the opposite side from said hook, a cap having a slotted shank engaging said hook loosely and having a tongue projecting in said standard loosely for centering the valve on its seat, and a lever pivotally connected to said standard and operatively connected to said cap.

2. A valve having a barrel provided with a hook formed on one side and a slotted standard formed on the other side diametrically opposite said hook, a cap for said barrel having a shank engaging said hook loosely and a tongue projecting loosely through said standard and constituting a guide for centering said cap on said barrel, and a lever pivotally connected to said standard for operating said cap.

3. A valve having a barrel provided with a hook formed on one side and a slotted standard formed on the other side diametrically opposite said hook, a cap having a perforated shank caught on said hook loosely and a tongue projecting loosely through said standard for centering said cap on said barrel, a lever having a plurality of perforations pivotally connected to said standard, and a link pivotally connected to said lever and to said cap.

4. A valve having a barrel provided with a hook formed on one side and a slotted standard formed on the other side diametrically opposite said hook, a cap having a perforated shank engaging said hook loosely and a tongue projecting loosely through said standard for centering the cap on said barrel, a lever having a bent arm and a plurality of perforations, and a link bar pivotally connected to said cap, said perforations and arm adapting said lever to be pivotally connected to said link bar and to said standard in different positions.

In testimony whereof, I set my hand in the presence of two witnesses, this 28th day of February, 1913.

JOHN M. BIRD.

Witnesses:
  A. L. JACKSON,
  J. W. STETT.

---

Copies of this patent may be obtained for five cents each, by addressing the "Commissioner of Patents, Washington, D. C."